July 25, 1933.　　　D. SANTINI　　　1,919,398
COPPER OXIDE RECTIFIER
Filed June 18, 1929

INVENTOR
Danilo Santini
BY
ATTORNEY

Patented July 25, 1933

1,919,398

UNITED STATES PATENT OFFICE

DANILO SANTINI, OF FOREST HILLS, PENNSYLVANIA, ASSIGNOR TO WESTINGHOUSE ELECTRIC & MANUFACTURING COMPANY, A CORPORATION OF PENNSYLVANIA

COPPER OXIDE RECTIFIER

Application filed June 18, 1929. Serial No. 371,901.

My invention relates to rectifiers and particularly to rectifiers utilizing the unilateral electrical conductivity existing at the contact between layers of materials of different chemical composition.

The rectifiers comprising the junction between metallic copper and a layer of copper oxide formed thereon, which are described in Patent No. 1,640,335 to L. O. Grondahl, are one example of rectifiers of the above-mentioned kind.

One object of my invention is to provide a simplified method of assembling rectifiers of the above-described type for operation on polyphase supply circuits.

One convenient form in which contact rectifiers may be made is that in which the individual elements constituting the rectifying units have the form of circular discs having holes in the centers thereof. Thus, discs of sheet copper $\frac{1}{16}''$ thick may have one face coated with oxide, in the manner described in the Grondahl patent, above-mentioned and have a lead washer placed in contact with the oxide face, the two washers thus assembled constituting a unit having an electrical conductivity which may be a thousand times as great in the direction in which positive electricity flows from oxide to copper than in the opposite direction. A single unit thus constituted has a uni-lateral electrical conductivity and is capable of rectifying an alternating voltage of approximately 3 volts. Where it is desired to rectify higher voltages, any appropriate number of such units may be assembled in series.

Rectifiers of the above-described type are extremely simple and find many applications; and, to be competitive with other devices in some of these fields, it is necessary that a simple, rugged and cheap way of assembling the units to rectify both half waves of alternating current be evolved. It is also desirable for certain services that the rectifier be operated from polyphase supply lines.

Figure 1:
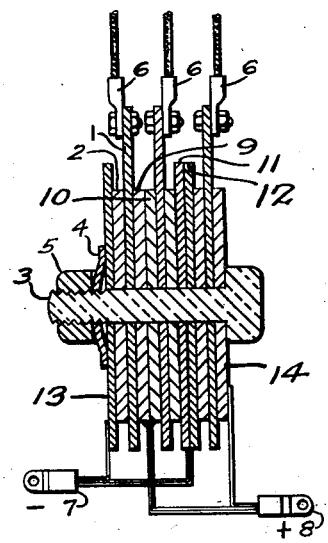
Figure 2:
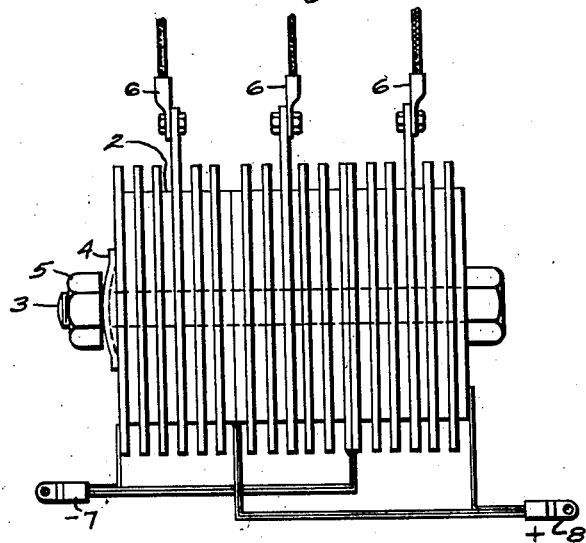

With the foregoing principles and purposes in mind, my invention may be understood through reading the following description, taken in conjunction with the appended drawing, in which, Figure 1 is a sectional view of a polyphase rectifier constructed in accordance with the principles of my invention, and adapted for operation on a supply circuit of 3 volts from phase to phase; and Fig. 2 is a side elevational view of a similar rectifier adapted for operation on a 9 volt supply circuit.

In order to provide for supplying both half waves of alternating current to a direct-current load, rectifier units of the type above described may be assembled in groups of two, the copper face 1 of one rectifying unit being placed in contact with the lead face 2 of the other. In the drawing, the copper disc is shown as of larger diameter than the lead disc, so that they may be readily identified. A plurality of groups of two units may then be placed upon a tie-rod 3 of insulating material, the outside lead terminal 9 of the first group being placed in contact with the outside lead terminal 10 of the second group, the outside copper terminal 11 of the latter being placed in contact with the outside copper terminal 12 of the third group, and so on. Three groups assembled in the foregoing manner suffice to constitute a rectifier for a three-phase line; and the units may be held firmly in position on the tie-rod by means of a spring washer 4 and a nut 5 on the end thereof.

In order to make suitable line connections, the three wires of the three-phase line are connected to the mid points 6 of the respective groups of two rectifying units thus constituted. The negative wire 7 of the direct-current line, is then connected to the copper terminal 13 of the first group, above described, and also to the copper terminals 11, 12 of the second and third groups which, it will be observed, are in contact with each other. The positive terminal 8 of the direct-current line is connected to the lead terminal 14 of the third group, above described, and also to the lead terminals 9, 10 of the first and second groups which, as will be observed, are in contact with each other.

As will be evident, the foregoing arrangement provides a very simple and convenient method of assembling the units of a three-phase rectifier where the voltage between three-phase lines is of the order of 3 volts. Where the voltage between lines is higher than this, each group may consist of two identical sub-groups, each consisting of several rectifying units in series. Thus, Fig. 2 shows an arrangement in which three rectifier units replace each single rectifier unit in Fig. 1, the connections otherwise being identical with those of Fig. 1 and requiring no separate description.

It will be observed that, where it is desired to apply rectifiers to lines of more than three phases that a fourth group may be added at the end of the third group in Fig. 1, above described, with its lead end terminal in contact with the lead end terminal of the third group; a fifth group may be added at the end of the fourth group, with its copper terminal in contact with the outer copper terminal of the latter; and so on for any number of phases.

The rule may always be followed that A. C. line terminals are connected to the mid points of each group and the positive direct-current line terminal is always connected to the lead washers, and the negative direct-current line terminal to the copper washers.

It will be recognized that, in the foregoing, the "lead washer" has been employed as typifying the bilaterally conducting contact with the outer surface of the copper oxide; and may be taken as covering any arrangement, such as a surface of reduced copper on said layer, which provides such a contact.

While the foregoing specifically describes my invention as applied to copper-oxide rectifiers, it is characteristic of all rectifiers that each rectifying unit has a positive terminal of one material, analogous to the lead washer, above described, and a negative terminal of a different material, analogous to the copper washer, above described. In the case of such other rectifier systems, the references to the lead washer in the foregoing description, may be taken as applying to the positive-terminal material and statements relative to the copper washer may be taken as applying to the negative-terminal material.

In accordance with the patent statutes, I have described one embodiment of the principle of my invention, but it will be understood that this is merely for purposes of illustration and that other modifications will be readily evident to those skilled in the art. Accordingly, I desire that the following claims shall be taken as limited only in accordance with their express terms and by the prior art.

I claim as my invention:

1. A polyphase rectifier comprising a plurality of groups, each consisting of two unilaterally conductive elements having their unlike terminals in contact with each other, means for mounting a plurality of said groups with like terminals contiguous to each other, means for making alternating-current line connections to intermediate points of each of said groups, and means for making direct-current line connections to end terminals of said groups.

2. A polyphase rectifier comprising a plurality of groups, each comprising two unilaterally conductive elements connected to be serially conductive, said groups being mounted on a core of insulating material with their like terminals in contact with each other, means for making alternating-current line connections to the intermediate points of each of said groups, and means for making direct-current line connections to end terminals of said groups.

DANILO SANTINI.